July 16, 1929.  G. RAMSEY  1,721,411
DIRECT VISION LIGHT METER VIEW SCOPE FOR CAMERAS
Filed Sept. 24, 1927  3 Sheets-Sheet 1
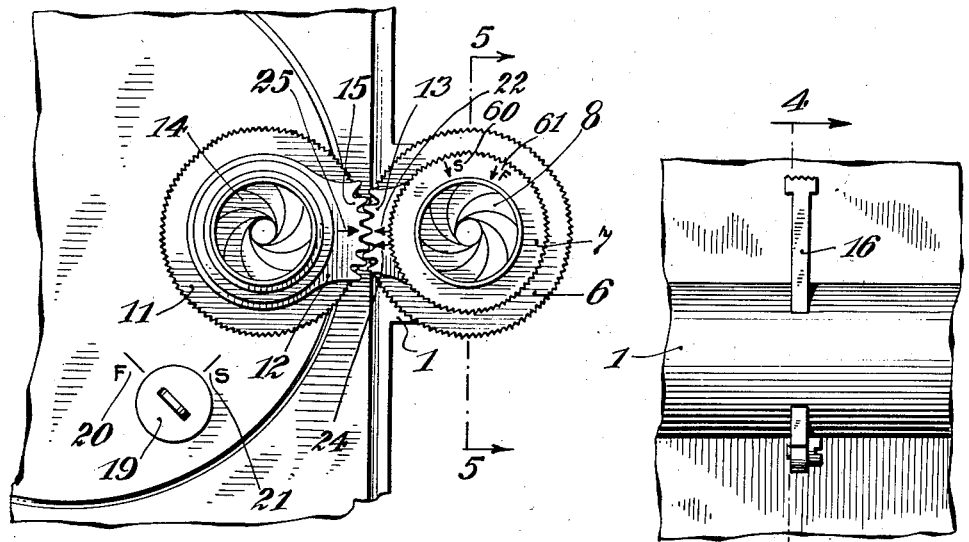
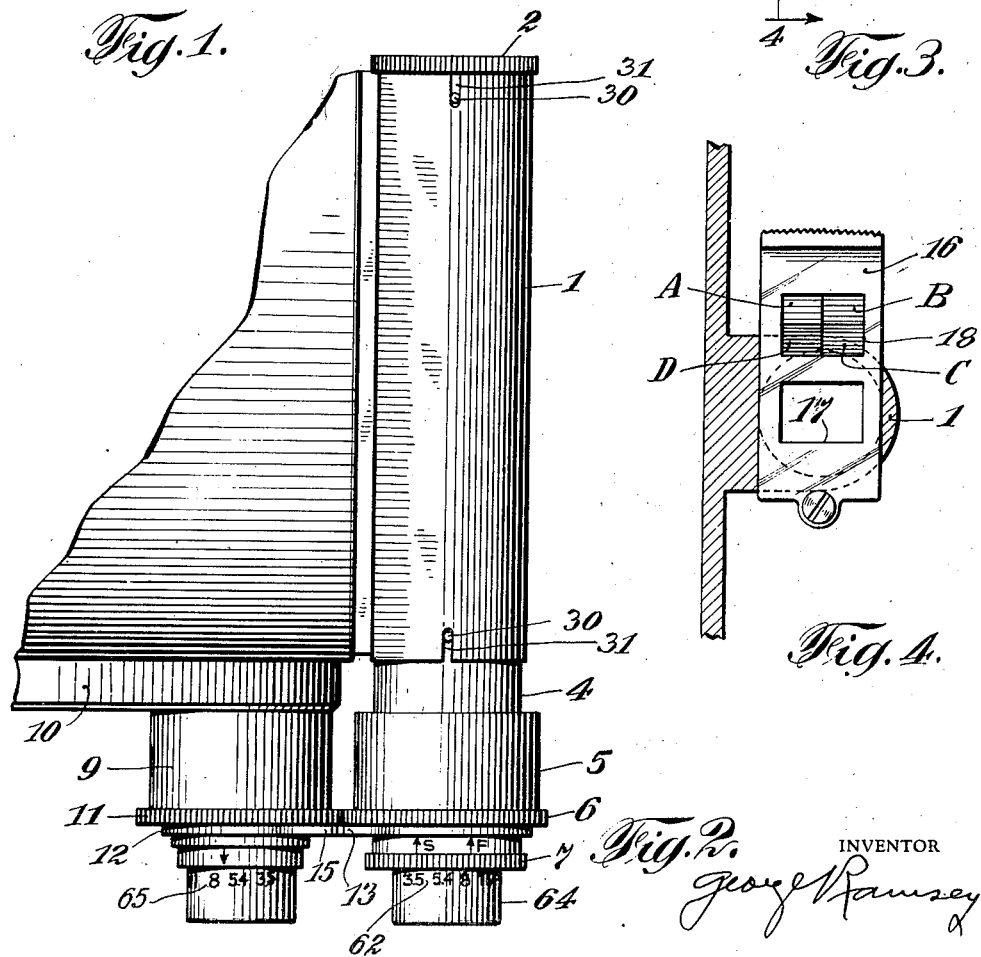

July 16, 1929.  G. RAMSEY  1,721,411
DIRECT VISION LIGHT METER VIEW SCOPE FOR CAMERAS
Filed Sept. 24, 1927   3 Sheets-Sheet 2

INVENTOR
George Ramsey

July 16, 1929.   G. RAMSEY   1,721,411
DIRECT VISION LIGHT METER VIEW SCOPE FOR CAMERAS
Filed Sept. 24, 1927   3 Sheets-Sheet 3

INVENTOR
George Ramsey

Patented July 16, 1929.

1,721,411

UNITED STATES PATENT OFFICE.

GEORGE RAMSEY, OF BROOKLYN, NEW YORK.

DIRECT-VISION LIGHT-METER VIEW SCOPE FOR CAMERAS.

Application filed September 24, 1927. Serial No. 221,638.

The present invention relates broadly to optics and more especially to a direct vision light meter view-scope for cameras.

The present invention is adapted more especially for a light meter view-scope for amateur moving picture cameras. Amateur moving picture cameras are often utilized to take scenes of action which may not be repeated, for example, the antics of a wild animal, or the picture of some personage in a parade, or other events of a fleeting nature. It is particularly desirable that the diaphragm opening of the camera lens shall be correct for the light conditions existing at the time the scene is being photographed, and that the camera lens shall be in focus. The operator frequently has a very short time in which to make the required adjustments and where light meters of the known type are used to determine the diaphragm settings, the scene has changed or the event has passed before the readings can be taken and the diaphragm correctly set.

The present invention comprises a novel light meter view-scope which may be operated without removing the view-scope from the operator's eye and whereby a correct setting of the camera lens both as to diaphragm opening and focus may be very quickly obtained.

The preferred form of the present invention comprises the use of a light meter view-scope the objective lens of which is matched to the camera lens, and with the light meter view-scope adjustments, both as to focus and as to diaphragm opening, being such that when the vision through the light meter view-scope shows a proper setting, the camera lens is correspondingly set. The invention also contemplates manually setting the camera lens diaphragm according to a reading obtained on the light meter.

Other and further objects of the present invention will in part be obvious and will in part be pointed out hereinafter in the specification following by reference to the accompanying drawings forming a part of the said specification.

It is realized that the present invention may be embodied in constructions other than those disclosed herewith and therefore, this disclosure is to be understood as illustrative and not in the limiting sense.

Fig. 1 is a front view of one form of the invention.

Fig. 2 is a plan view of the form shown in Fig. 1.

Fig. 3 is a side view of one form of light meter screen carrier.

Fig. 4 is a sectional view on line 4—4 of Fig. 3.

Figure 5:
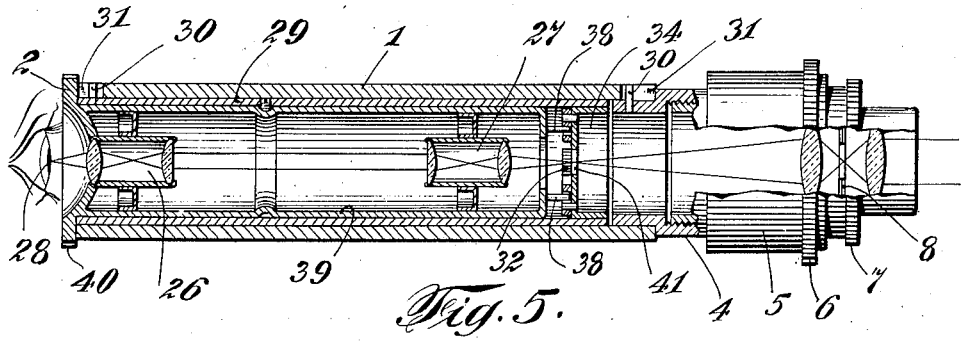
Fig. 5 is a sectional view of a view-scope on line 5—5 of Fig. 1.

The present invention as is illustrated in Figs. 1 to 8 inclusive is shown as associated with an amateur moving picture camera of the type known as "Filmo" which is disclosed in United States patent to Howell 1,620,726, March 15, 1927.

Referring now more especially to Figs. 1 and 2, the present invention comprises a view-scope tube 1 carrying an eye piece lens 2 and an objective lens collar 4 in which an objective lens 5 is mounted. This collar 4 is adapted to be slipped into the view-scope tube 1. The objective lens of the view-scope is matched with the camera lens and is provided with a focusing ring 6 and a diaphragm control member 7 for controlling the diaphragm 8 of the view-scope lens. A camera lens 9 of the same type as the objective lens 5 of the view-scope, is mounted on the camera frame 10 and is also provided with a focusing ring 11 which is geared to the focusing ring 6 of the view-scope lens. The control member 12 of the camera lens controls the camera diaphragm 14 and is provided with a geared segment 15 which is adapted to engage gear teeth 13 on the diaphragm control member 7 of the view-scope lens 5. The objective lens 5 of the view-scope is so mounted with reference to the focusing ring thereof that a rotation of the focusing ring 6 causes the objective lens 5 of the view-scope to move inwardly or outwardly exactly the same as the inward or outward movement of the camera lens 9. This may be accomplished by gearing to focusing ring 6 of the view-scope to the focusing ring 11 of the camera lens, which means that when the focusing ring 6 of the view-scope is rotated in one direction, it produces an opposite rotation to the focusing ring 11 on the camera lens. Where this construction is used, the relation between the respective focusing mounts on the objective lens 5 of the view-scope and the camera lens 9 is such as to cause both lenses to move out at the same time and in at the same time. The same geared relation exists between the diaphragm control 7 of the view-scope objective lens 5 and the diaphragm control 12 of the camera lens 9 so that when the diaphragm control 7 on the view-scope is operated to close the view-scope diaphragm 8, the geared segment 15 operates to correspondingly close the diaphragm 14 of the camera lens 9. Since both the view-scope objective lens and the camera lens move in and out simultaneously for focusing, the geared segment 15 on the camera lens 9 is at all times in proper engagement with the teeth on the diaphragm control member 7 of the objective lens 5.

Referring to Figs. 3 and 4, the view-scope tube 1 may carry a vertically slidable frame 16 provided with an opening 17 and carrying a light meter screen window 18. When the apparatus is being used as a view-scope, the opening 17 is in position so that the view through the view-scope objective lens is not obscured when the operator views the scene through the eye piece 2. Having obtained the proper focus, the operator depresses the slidable frame 16 to bring the light meter screen window 18 into position so that the operator now views the scene through the light meter screen window 18. The light meter screen window 18 is preferably formed with sections A, B, C and D, each of different density to the transmission of light; the section A being of the least density and the section D of the greatest density. The operator now rotates the diaphragm control member 7 of the view-scope thereby cutting down the light visible through the view-scope system until the scene is no longer visible through the section D of the window and is partly visible through section C and more completely visible through section B. When this condition is reached, the diaphragm of the view-scope is correctly set. This setting of the view-scope diaphragm automatically sets the diaphragm 12 of the camera lens 9 for a correct exposure of the scene to be photographed for the then existing light. The amount of light to correctly expose the film is dependent upon the speed of the shutter of the camera and since amateur moving picture cameras usually are provided with means to set the shutter for slow or fast speed, provision is made in the present invention to regulate the camera diaphragm accordingly. In the "Filmo" camera, a speed control member 19 may be set opposite an indicator 20, which causes the camera to operate at fast speed or sixteen pictures per second, or the speed control member 19 may be set opposite an indicator 21, so that pictures are taken at slow speed or at the rate of eight pictures per second. In order to provide for this setting of the shutter speed, a certain tooth on the view-scope diaphragm control member 7 is marked with an indicator 22 and another of the teeth is marked with an indicator 24. The geared segment 15 is also provided with a marked tooth 25. Where the camera is to be operated at normal speed or sixteen pictures per second, the indicator 22 on the diaphragm control 7 is placed opposite the marked tooth 25 when the objective lens collar 4 is slipped into the tube 1. Where the camera is operating at slow speed, the indicator marked 24 is placed opposite the marked tooth 25 which closes the camera diaphragm slightly more than the view-scope diaphragm, and then the light meter readings are taken through the sections B, C and D of the light meter window. The operator, however, may permit the setting between the diaphragm control member 7 and the segment 15 to remain engaged with the indicator 22 opposite to the marked tooth 15, in which case the operator observes the scene through sections A, B and C of the window 18 when the camera is operating at slow speed and closes the view-scope diaphragm until the scene completely disappears from section C of the window and is slightly visible in section B, and more completely visible in section A. This condition produces a smaller diaphragm opening which is the desirable setting for slow speed operation.

Referring now more especially to Fig. 5, which illustrates the eye piece lens more completely, it will be observed that the eye piece lens comprises a pair of lenses 26 and a second pair of lenses 27. This lens system together with the view-scope objective lens 5 comprises a telescope with the image as viewed by the eye 28 as being upright. This is merely a matter of convenience and is the preferred form of the invention.

Figure 6:
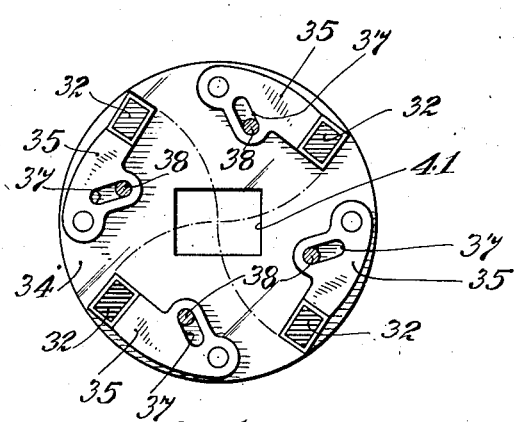
Fig. 6 is a detailed view of the screen carrier shown in Fig. 5 and showing the screen open or in inoperative position.
Figure 7:
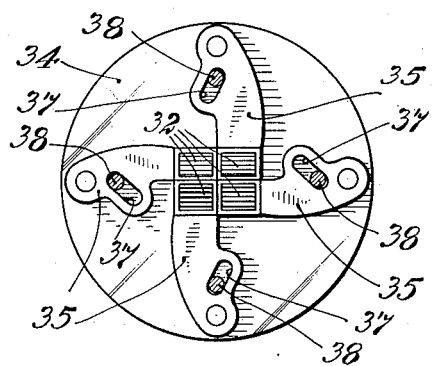
Fig. 7 is a view similar to Fig. 6 showing the screen closed and in operative position.
Figure 8:
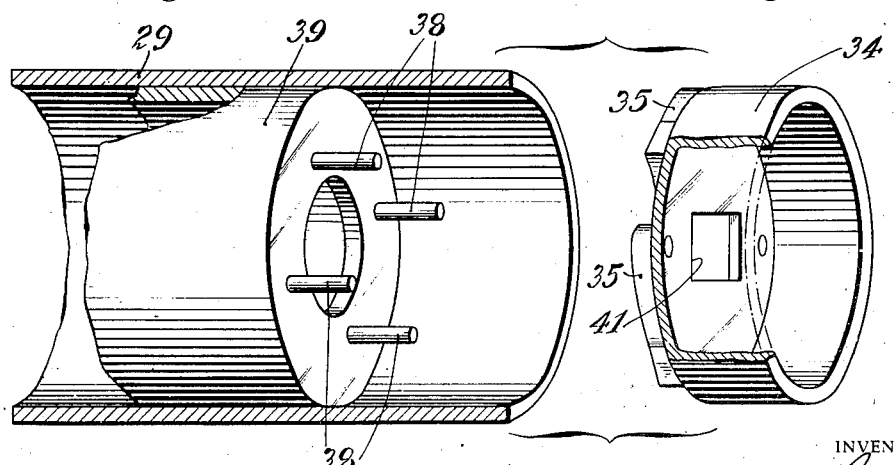
Fig. 8 is an extended view of the screen operating mechanism.

The light meter screen window, illustrated in Figs. 5 to 8 inclusive, is mounted within the tube 29 that slips into the view-scope tube 1, and is held stationary therein by the pin 30 in the slot 31. The light meter screen window comprises sections 32. A stationary supporting collar 34 carries arms 35, upon which sections 32 of the light meter screen window are mounted. The arms 35 are provided with slots 37 into which project operating pins 38. These operating pins may be connected with the eye piece tube 39 which is rotatably mounted in the slip tube 29 in such manner that it may be turned by the thumb piece 40. The turning of the thumb piece 40 in one direction rotates the tube 39 and causes the operating pins 38 to swing the arms 34 and thereby bringing the window screen sections 32 into position over the opening 41 in the supporting collar 34. This opening 41 outlines the scene to be photographed. When the tube 35 is rotated in the opposite direction, the arms 35 swing outwardly to remove the sections 32 from over the opening 41 to inoperative position as shown in Fig. 6. The use of the device in this form as a light meter is the same as that of the form previously described.

Figure 9:
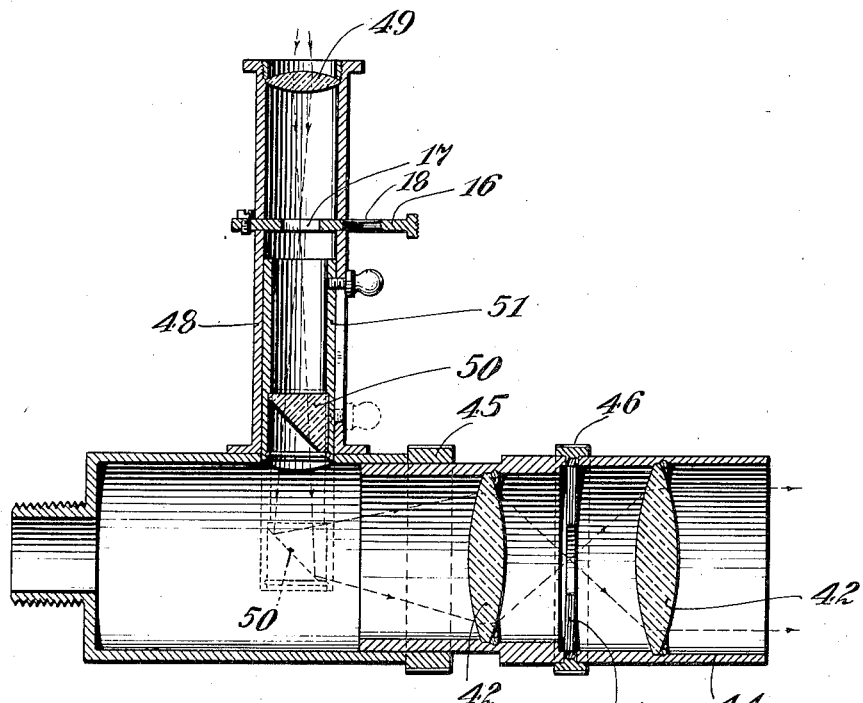
Fig. 9 is a view of the invention applied to a telephoto lens.

Fig. 9 illustrates the invention as adapted to a telephoto camera lens provided with means for viewing the scene directly through the telephoto camera lens itself. In the form illustrated in Fig. 9, the telephoto camera lens 42 is carried in a tube 44, which supports a focusing ring 45 illustrated more or less diagrammatically and a diaphragm ring 46 adapted to operate the diaphragm 47. The tube 44 for the lens carries an eye piece tube 48 in which is mounted an eye piece 49 and a prism 50 which is mounted upon a prism carrier 51 that slides into eye piece tube 48 to move the prism 50 from inoperative position to the operative position, shown in dotted lines in Fig. 9, at which time the view through telephoto lens 42 is viewed directly through the eye piece 49. The eye piece tube 48 carries a slidable member 16 exactly like the slidable member previously described. This member 16 as previously described is provided with an opening 17 through which the view may be unobstructed and is also provided with a view-scope window having four sections of varying density as previously specified. In the operation of this form of the device, the slidable member is first moved with the opening 17 in position so that the operator may focus the lens on the scene. Then, the slidable member is moved to position the window 18 in the line of vision and the operator now closes the diaphragm 47 by means of the diaphragm ring 46 until the light reading as previously explained is obtained. When this reading is obtained, the diaphragm 47 has been correctly set for proper exposure of the film through the telescope lens. The prism is now raised to inoperative position and the scene may be photographed in the regular way.

Figure 10:
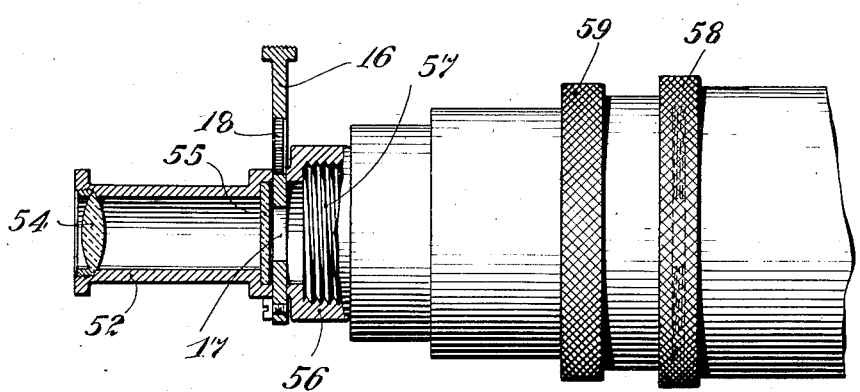
Fig. 10 is a view of the invention as applied to a focusing microscope into which a lens is adapted to be set.

Fig. 10 illustrates the present invention as applied to a focusing microscope adapted to be screw threaded on the end of a camera lens which has been removed from the camera. This focusing microscope comprises tube 52 carrying an eye piece 54, a ground glass 55 and a collar 56 having screw threads corresponding to the threads on the end of the lens 57. The lens 57 is a regular camera lens which has been removed from the camera in order to obtain a correct setting of the focus thereof by use of the focusing microscope. To this end, the image through the lens 57 is focused to the face of the ground glass 55. The slidable frame 16 is mounted, preferably in front of the ground glass 55 and is provided with a clear opening 17 and a light meter window 18, as previously described. After the operator has focused the lens on the ground glass, by means of the focusing ring 59, the slidable frame is moved to position the light meter window 18 over the ground glass and the operator then turns the lens diaphragm until the reading as previously described is obtained. The focusing microscope is now removed from the lens and the lens reinserted from the camera without disturbing either the focus or the diaphragm setting thereof. This form of the invention requires greater time to operate but is a simpler form of the device.

In connection with the form of the invention disclosed in Figs. 1, 2, and 5, it may be desirable to be able to operate the light meter without automatically setting the diaphragm of the camera lens. Where this is desirable, either the gear segment 13 on the view-scope objective lens or the gear segment 15 on the camera lens is removed. These gear segments are adapted, in the preferred form, to be removable from the parts on which they set in order that these parts may have independent movement. With the gear segments removed the operator reads the indicators 60 and 61 (Fig. 1) on the view-scope lens diaphragm control 7 as against the scale 62 (Fig. 1) on the light meter lens tube 64. The operator reads the indicator 60 when the camera is set to operate at low speed and reads the indicator 61 when it is set for fast speed. Having turned the diaphragm control member 7 to determine the light values of the scene being photographed, and taken the reading as explained, the operator then sets the diaphragm 14 for the camera on the scale 65 in accordance with the reading obtained on the light meter. By disconnecting the diaphragm on the light meter from the camera diaphragm the operator is enabled to take light meter readings and then take away the light meter window and open up the light meter view-scope diaphragm to more clearly view the scene being photographed without disturbing the diaphragm setting for the lens of the camera.

The present invention enables the operator to obtain correct focus and diaphragm settings by direct vision of the scene to be photographed through a lens corresponding to the lens which is in use in the camera when the photograph is taken. This permits the operator to very accurately and quickly determine the exact light which will fall on the film during photographing operation.

Having described my invention, I claim:

1. A direct vision light meter view-scope for cameras comprising a telescope for viewing the scene to be photographed, a diaphragm for controlling the amount of light passing through said telescope and a light meter window movable into and out of the path of rays of light passing through said telescope.

2. A direct vision light meter view-scope for cameras comprising a telescope for viewing the scene to be photographed, means for controlling the amount of light passing through said telescope, and a light measuring member movable into and out of the path of rays of light passing through said telescope.

3. A direct vision light meter and view-scope for cameras comprising a telescope, a camera lens, the objective lens of said telescope lens being matched to correspond to said camera lens, a diaphragm for controlling the light through said telescope, a diaphragm for said camera lens, means to operate the diaphragm of the telescope, means to operate the camera lens diaphragm, and similar indicating scales carried by both of said means.

4. A direct vision light meter and view-scope for cameras comprising a telescope, a camera lens, the objective lens of said telescope lens being matched to correspond to said camera lens, a diaphragm for controlling the light through said telescope, a diaphragm for said camera lens, means to operate the diaphragm of the telescope, means to operate the camera lens diaphragm, and devices connecting said means to permit simultaneous operation of both diaphragms.

5. In a direct vision light meter and view-scope for cameras, a camera lens, a diaphragm for said camera lens, a view-scope comprising an objective lens and an eye piece to permit the scene to be photographed to be viewed through said view-scope objective lens, a light meter member adapted to be interposed in the path of the rays of light through said view-scope, a diaphragm for regulating the amount of ligh passing through said window, means to control said second mentioned diaphragm, and a scale upon said means to indicate the proper setting for the diaphragm of the camera lens when the intensity of light from the scene to be photographed has been determined through said window.

6. In a direct vision light meter and view-scope for cameras, a camera lens, a diaphragm for said camera lens, a view-scope comprising an objective lens and an eye piece to permit the scene to be photographed to be viewed through said view-scope objective lens, a light meter member adapted to be interposed in the path of the rays of light through said view-scope, a diaphragm for regulating the amount of light passing through said window, means to control said second mentioned diaphragm, and means to automatically set the diaphragm of the camera lens when the intensity of light from the scene to be photographed has been determined through said window.

7. A direct vision light meter and view-scope for cameras comprising a camera lens, a diaphragm for said camera lens, a view-scope objective lens, a view-scope eye-piece whereby the scene to be photographed may be visualized through said eye-piece, a light observation screen adapted to be moved into the path of rays of light through said view-scope, a diaphragm for controlling the amount of light falling upon said screen, and means to operate said second mentioned diaphragm and to determine proper settings for the camera lens diaphragm for the light conditions of the scene to be photographed.

8. A direct vision light meter and view-scope for cameras comprising a camera lens, a diaphragm for said camera lens, a view-scope objective lens matched to correspond to said camera lens, a view-scope eye-piece whereby the scene to be photographed may be visualized through said eye-piece, a diaphragm for controlling the amount of light passing through said eye-piece, and means to operate said second mentioned diaphragm and to determine proper settings for the camera lens diaphragm for the light conditions of the scene to be photographed.

9. A direct vision light meter and view-scope comprising a view-scope telescope having an objective lens and an eye-piece, a light observation screen having distinct areas of different density to the passage of light and adapted to be moved into and out of the path of the rays of light through said view-scope, and a diaphragm to control the amount of light falling upon said screen.

10. A direct vision light meter and view-scope comprising a view-scope telescope having an objective lens and an eye-piece, and a light observation screen having distinct areas of different density to the passage of light and adapted to be moved into and out of the path of the rays of light through said view-scope.

11. In a direct vision view-scope and light meter, the combination of a telescope comprising an objective lens and an eye-piece to view the scene to be photographed, a light meter screen adapted to interrupt a portion of the light through said telescope and being movable into and out of the path of light through said telescope, and a diaphragm for controlling the amount of light reaching the eye piece and passing through said screen, a camera lens, means to focus said camera lens, means to focus said telsecope, and devices connecting said means for simultaneous operation.

12. A direct vision light meter view-scope for cameras comprising a telescope, a diaphragm for regulating the amount of light passing through said telescope, a light meter screen movable into the rays of light passing through said telescope, a camera lens, a diaphragm for said camera lens, and means operatively connecting both of said diaphragms whereby the setting of one diaphragm controls the setting of the other.

13. A direct vision light meter view-scope for moving picture cameras comprising a telescope, a diaphragm for regulating the amount of light passing through said telescope, a light meter screen movable into the rays of light passing through said telescope, a moving picture camera lens, a diaphragm for said camera lens, and means operatively connecting both of said diaphragms whereby the setting of one diaphragm controls the setting of the other, said means being adjustable according to the speed of the camera.

14. A direct vision view-scope for cameras comprising a telescope, means to regulate the amount of light observable through the eye-piece of said telescope, a light meter member having portions of different light density simultaneously visible, and means to move said member into and out of the path of the rays of light through said telescope.

15. A direct vision light meter and view-scope for cameras comprising a telescope, means to regulate the amount of light passing through said telescope, a light meter member mounted within said telescope, a camera lens, a diaphragm for said camera lens, and mechanism operatively connecting said diaphragm with said means.

16. A direct vision light meter and view-scope for cameras comprising a camera lens, means comprising an eye-piece to view the scene comprising the field of said camera lens, a light meter member movable into and out of the path of the rays of light through said eye-piece, and means to control the amount of light passing through said eye-piece.

17. A direct vision light meter and view-scope for cameras comprising a camera lens, means comprising an eye-piece to view the scene comprising the field of said camera lens, a light meter member comprising a screen having portions of different light densities and movable into and out of the path of the rays of light through said eye-piece, and means to control the amount of light passing through said eye-piece.

18. A view-scope for cameras comprising a telescope, a diaphragm for said telescope, a camera lens, a diaphragm for said camera lens, and light measuring means movable through the path of light through said telescope.

GEORGE RAMSEY.